May 5, 1964
A. R. ANDERSON ETAL
3,131,562
HIGH TEMPERATURE MEASURING PROBE
Filed March 30, 1961
2 Sheets-Sheet 1
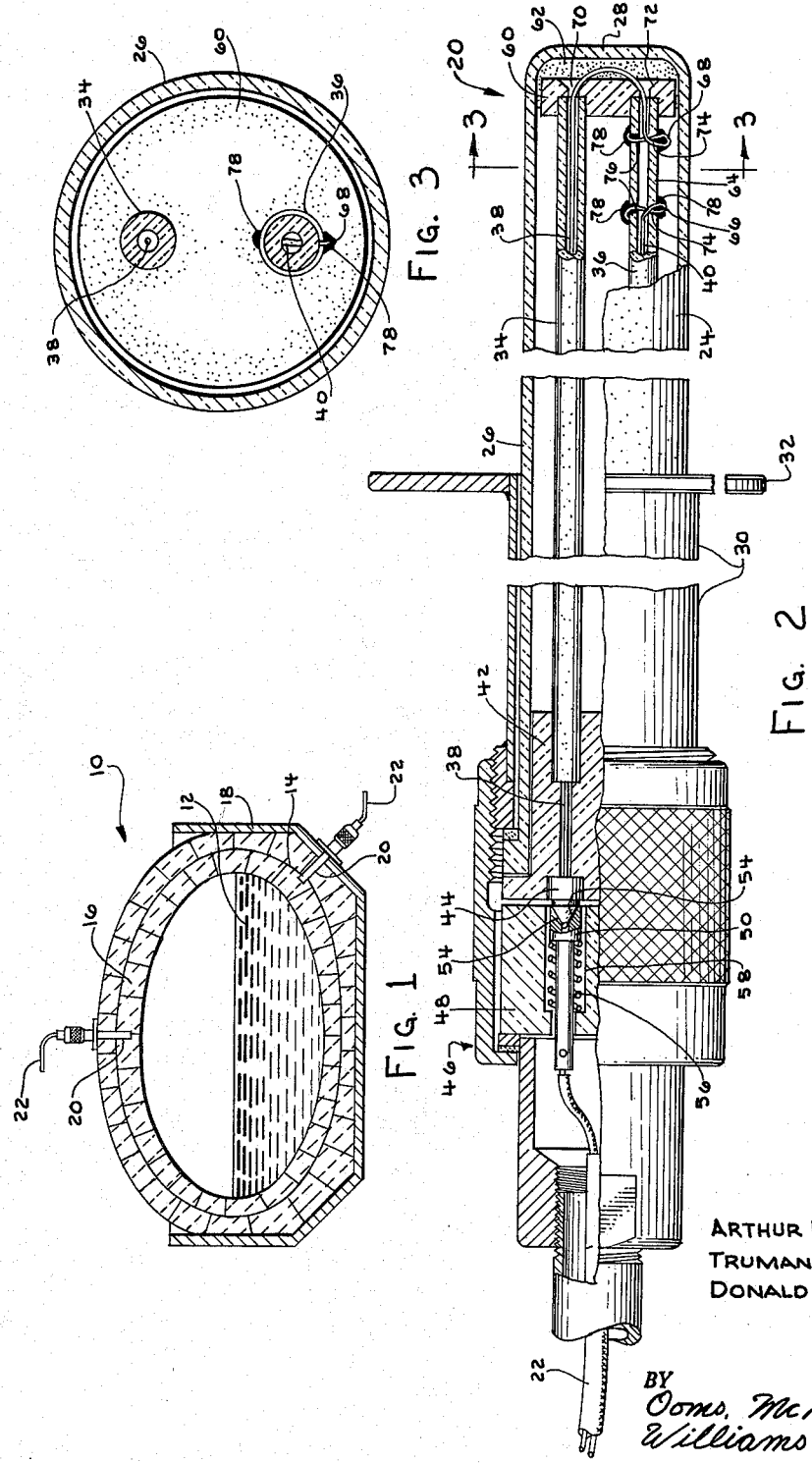
ARTHUR R. ANDERSON
TRUMAN M. STICKNEY
DONALD W. GORDON
INVENTORS
BY Ooms, McDougall,
Williams + Hersh
ATT'YS.

May 5, 1964     A. R. ANDERSON ETAL     3,131,562
HIGH TEMPERATURE MEASURING PROBE
Filed March 30, 1961     2 Sheets-Sheet 2

ARTHUR R. ANDERSON
TRUMAN M. STICKNEY
DONALD W. GORDON
    INVENTOR.S

BY Ooms, McDougall,
Williams + Hersh
    ATT'YS.

United States Patent Office 3,131,562
Patented May 5, 1964

3,131,562
HIGH TEMPERATURE MEASURING PROBE
Arthur R. Anderson, Glenview, Truman M. Stickney, Morton Grove, and Donald W. Gordon, Chicago, Ill., assignors to Cook Electric Company, Chicago, Ill., a corporation of Delaware
Filed Mar. 30, 1961, Ser. No. 99,462
9 Claims. (Cl. 73—362)

This invention relates to devices for continuously measuring extremely high temperatures.

One object of the present invention is to provide a new and improved device for continuously measuring extremely high temperatures, which may be in the range from 2,000–3,200° F., for example.

Another object is to provide a new and improved temperature measuring device utilizing a resistor element for sensing the high temperatures to be measured.

A further object is to provide a new and improved temperature measuring device of the foregoing character, in the form of a probe which will find many applications, but is particularly well adapted for measuring high temperatures in the wall or roof of a hearth or furnace for refining or processing molten metals.

Another object of the present invention is to provide a new and improved high temperature measuring device capable of giving results which are accurate, consistent and reproducible.

A further object is to provide a new and improved high temperature measuring probe in which the resistor sensing device is arranged so as to avoid short circuiting and grounding effects due to the heating of the insulating supports for the resistor device.

Another object is to provide a new and improved temperature measuring probe which is constructed so as to resist the high temperatures to be measured by the probe.

Further objects and advantages of the present invention will appear from the following description, taken with the accompanying drawings, in which:

FIG. 1 is a diagrammatic sectional view taken through a metallurgical hearth or furnace equipped with high temperature measuring probes constructed in accordance with the present invention.

FIG. 2 is an elevational view, partly in longitudinal section, showing one of the high temperature measuring probes.

FIG. 3 is an enlarged cross-sectional view, taken generally along a line 3—3 in FIG. 2.

Figure 4:
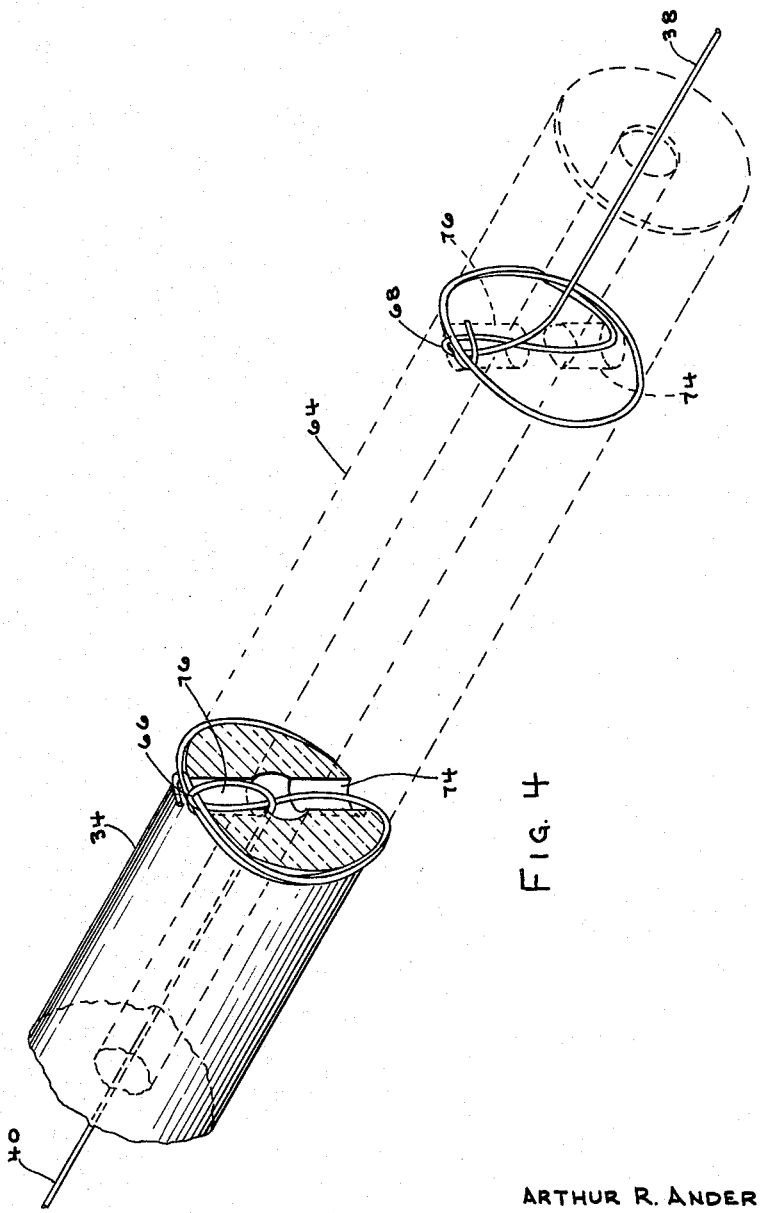
FIG. 4 is a fragmentary enlarged perspective view showing details of the probe.

It will be seen that FIG. 1 illustrates a hearth or furnace 10 of a type commonly employed for melting, refining and processing metals. Thus, the hearth 10 is generally oval in cross section and is adapted to hold a pool of molten metal 12. The illustrated hearth 10 has a lower wall portion 14 and a roof portion 16, both of which may be made of firebrick. A metal receptacle 18 may be provided to support the firebrick wall and roof 14 and 16.

Measuring devices in the form of probes 20 may be provided to measure the high temperatures in the wall 14 and the roof 16. Electrical cables or wires 22 extend from the probes 20 to indicating equipment (not shown) so that the temperatures, sensed by the probes, may be continuously monitored.

As shown to advantage in FIG. 2, each temperature measuring probe 20 comprises a refractory casing 24 adapted to extend into the wall or roof of the hearth 10. The casing 24 may be made of a material, such as vitrified 99 percent alumina, adapted to resist the high temperatures in the furnace wall and roof. In this case, the casing 24 is in the form of a cylinder or tube having a cylindrical side wall 26 which is closed at its outer ends by an end wall 28. The other end of the protective tube or casing 24 is mounted within a housing 30 which may be made of metal and may be cylindrical in shape. A flange 32 may be secured to the right hand end of the metal housing 30, for use in securing the probe 20 to the wall or roof of the hearth 10.

It will be seen that two parallel elongated supports 34 and 36 are provided within the protective casing 24. As shown, the supports 34 and 36 take the form of elongated refractory tubes which may be made of a material such as vitrified 99 percent alumina. Wires or leads 38 and 40 are received and supported within the tubes 34 and 36. The wires 38 and 40 may be made of a material such as a platinum-iridium alloy, so as to resist the high temperatures to be measured by the probe.

The inner or left hand ends of the refractory tubes 34 and 36 are mounted in an insulating bushing 42 which is secured within the left hand end of the protective casing 24. The wires 38 and 40 are connected to a pair of terminals 44 which are mounted in the bushing 42. A coupling 46 is provided to connect the terminals 44 to the electrical cable 22. As shown, the coupling 46 includes a second bushing 48. Receptacle terminals 50 are slidable in the bushing 48 and are engageable with the terminals 44. It will be seen that each terminal 44 has a generally cone-shaped end portion 52 adapted to mate with a conical socket 54 in the terminal 50. A spring 56 is provided to urge the terminal 50 against the terminal 44. It will be seen that the spring 56 is positioned in a bore 58 which is formed in the bushing 48. The action of the spring 56 on the terminal 50 ensures that the terminal 50 will securely engage the terminals 44. Moreover, the spring action compensates for thermal expansion and contraction of the probe. The leads of the electrical cable 22 are connected to the spring pressed terminals 50.

As shown in FIG. 2, the outer or right hand ends of the refractory supporting tubes 34 and 36 are mounted in a refractory disc or end piece 60 which is mounted in the outer end of the protective casing 26, adjacent the end wall 28. The end piece 60 may be made of a material, such as lava, adapted to resist the high temperatures to be measured. A mass of high temperature cement 62 may be employed to secure the end piece 60 within the right hand end of the protective casing 26. The cement 62 may be in the form of firebrick mortar, for example.

In the illustrated construction, the temperature sensing element takes the form of a portion or section 64 of the refractory tube 36. The leads or wires 38 and 40 are employed to establish electrical connections to the ends of the temperature sensing section 64. Thus, the lead 40 has a terminal portion 66 spaced a substantial distance from the right hand end of the refractory tube 36. The other lead 38 extends into the right hand end of the tube 36 and has a terminal portion 68 spaced from the terminal portion 66. The temperature sensing portion 64 of the tube 36 extends between the terminal portions 66 and 68.

It will be seen that the wire 38 extends through openings 70 and 72 in the end piece 60. Between the openings 70 and 72, the wire 38 extends through the high temperature cement 62.

As shown, the terminal portions 66 and 68 of the wires 38 and 40 are anchored to the refractory tube 36 in a special manner. Thus, each wire is brought out through a radial hole 74 which is formed in the wall of the tube 36. The wire is then doubled back through the hole 74 and is brought out through a hole 76 which is formed in the tube 36, diametrically opposite from the hole 74. The projecting end of the wire is then wrapped tightly around the circumference of the tube 36, brought through the loops shown at 66 and 68, pulled tight, turned 180 degrees and bent down against the outside of the tube 36. Of course, a separate set of holes 74 and 76 is provided for the terminal portion of each of the wires 38 and 40. The terminal portions 66 and 68 are securely anchored by filling the outer ends of the holes 74 and 76 with masses of firebrick mortar or other high temperature cement 78. It will be seen that the cement 78 is heaped up to some extent on the outside of the tube 36, around the holes 74 and 76, and covering the wires at these points.

At ordinary room temperatures, the vitrified alumina or other similar material, employed in the tubes 34 and 36, is a good electrical insulator, so that the electrical resistance of the temperature sensing section 64 of the tube 36 is extremely high. However, at temperatures in the range from 2,000 to 3,200° F., the resistance of the vitrified alumina is greatly reduced so that it is capable of conducting an appreciable current. The resistance of the vitrified alumina or other refractory material decreases with increasing temperature. Thus, the temperature sensing section 64 is actually a resistor element which may be calibrated so that its resistance will be an accurate indication of the temperature. The resistance, and hence the temperature, may be monitored continuously.

Throughout the temperature range to be measured, the resistance of the leads or wires 38 and 40 is low compared to the resistance of the temperature sensing section 64 of the refractory tube 36. Thus, the leads 38 and 40 provide low resistance connections to the ends of the temperature sensing section 64. Accordingly, the calibration of the temperature measuring probe is not affected to any substantial extent by the decrease in the resistance of the protective casing 26, the tube 34, bushing 42, the portions of the tube 36 other than the sensing portion 64, the end piece 60, and the high temperature cement 62. All of these refractory components decrease in resistance with increasing temperature, but the resistance of the wire leads 38 and 40 is so much lower than the resistance of the refractory supporting components, that the calibration of the probe is not materially affected.

The inner or left hand portions of the protective casing 26 and the tubes 34 and 36 are not heated sufficiently, during normal operation, to impair their electrical insulating properties. Thus, the heating of the outer end portions of the casing 26 and the tubes 34 and 36 does not result in any grounding of the temperature sensing portion 64.

The manner in which the terminal portions 66 and 68 of the wire leads 38 and 40 are doubled back, knotted and anchored in the holes 64 and 76 contributes materially to the consistency and reproducibility of the results obtained with the temperature measuring probe. Consistent electrical contact is maintained between the ends of the temperature sensing section 64 and the ends of the wires 38 and 40, throughout the temperature range to be measured.

It will be understood that the refractory tube 36, of which the temperature sensing section 64 is a part, may be made of various metallic oxides or other materials which are electrical insulators at ordinary room temperatures, but show progressively increasing conductivity at elevated temperatures. Such materials decrease in electrical resistance with increasing temperature, when the temperature is sufficiently high.

The tubebs 34 and 36, other than the temperature sensing resistor portion 64, support and protect the lead wires 38 and 40, while also isolating the temperature sensing portion 64 from ground. The outer protective casing 26 also assists in isolating the temperature sensing portion 64.

Various modifications, alternative constructions and equivalents may be employed without departing from the true spirit and scope of the invention, as exemplified in the foregoing description and defined in the following claims.

We claim:

1. A high temperature measuring device, comprising an elongated tubular protective casing made of refractory material, said casing having its outer ends closed by an end wall, means supporting the inner end of said casing, first and second parallel refractory tubes extending within said casing between the inner and outer ends thereof, an end piece within said casing adjacent said end wall and secured to the outer ends of said tubes, refractory cement securing said end piece to said end wall, a first metal wire lead extending through said first tube from the inner end thereof to a point spaced from the outer end thereof, said first tube having diametrically opposite holes therein at said point, said first lead having a terminal portion brought out through one of said holes, doubled back through the same hole to form a loop, brought out through the other of said holes, wound around said first tube, and knotted through said loop, a second metal wire lead extending through said second tube from the inner end thereof to the outer end thereof and then extending outwardly through said end piece, through said cement, and inwardly through said end piece into the outer end portion of said first tube, said second lead terminating at a second point on said first tube spaced from said first point, said first tube having a second pair of diametrically opposite holes at said second point, said second lead having a terminal portion brought out through one of said second holes, doubled back through the same hole to form a second loop, brought out through the other of said second pair of holes, wound around said first tube, and knotted through said second loop, masses of refractory cement filling said holes and anchoring said terminal portions of said leads, and means for establishing electrical connections to the inner ends of said leads, said first tube having a portion extending between said terminal portions of said leads and constituting a temperature sensing resistor element affording variable electrical resistance at high temperatures.

2. In a high temperature measuring device, the combination comprising first and second parallel refractory tubes, a refractory member connected between the outer ends of said tubes, a first metal wire lead extending through said first tube from the inner end thereof to a first point spaced from the outer ends thereof, said first lead having a terminal portion engaging said first tube at said first point, and a second metal wire lead extending through said second tube between the inner and outer ends thereof and then extending into the outer end of said first tube to a second point thereon spaced from said first point, said second lead having a terminal portion engaging said first tube at said second point, said first tube having a temperature sensing portion extending between said terminal portions of said leads and forming a resistor element affording variable resistance at high temperatures.

3. In a high temperature measuring device, the combination comprising first and second parallel refractory tubes, a refractory member connected between the outer ends of said tubes, a first metal wire lead extending through said first tube from the inner end thereof to a first point spaced from the outer ends thereof, said first lead having a terminal portion engaging said first tube at said first point, a second metal wire lead extending through said second tube between the inner and outer ends thereof and then extending into the outer end of said first tube to a second point thereon spaced from said first point, said second lead having a terminal portion engaging said first tube at said second point, and a protective refractory casing received around said tubes, said first tube having a temperature sensing portion extending between said terminal portions of said leads and forming a resistor element affording variable resistance at high temperatures.

4. In a device for measuring high temperatures, the combination comprising a refractory tube, a first lead extending inside said tube from one end thereof to a first point therealong, said tube having a first pair of diametrically opposite holes therein at said first point, said first lead having a terminal portion knotted through said holes, and a second lead extending inside said tube from the opposite end thereof to a second point therealong spaced from said first point, said tube having a second pair of holes at said second point, said second lead having a terminal portion knotted through said holes of said second set, the portion of said tube between said terminal portions of said leads constituting a resistor element affording variable resistance at high temperatures.

5. In a temperature measuring device, the combination comprising first and second refractory tubes, a refractory member connected between the outer ends of said tubes, a first lead extending inside said first tube from the inner end thereof to a first point therealong spaced a substantial distance from said refractory member, a first pair of holes in said first tube at said first point, said first lead having a terminal portion brought out through one of said holes, doubled back through the same hole to form a loop, brought out through the other hole of said pair, wound around said first tube, and passed through said loop, and a second lead extending through said second tube and then through said refractory member and into the outer end of said first tube to a second point spaced from said first point, said first tube having a second pair of holes therein at said second point, said second lead having a terminal portion brought out through one of the holes of said second pair, doubled back through the same hole to form a second loop brought out through the other hole of said second pair, wound around said first tube, and passed through said second loop, the portion of said first tube between said terminal portions of said first and second leads constituting a resistor element affording variable resistance at high temperatures.

6. In a high temperature measuring device, the combination comprising first and second generally parallel refractory tubes, a refractory member connected between the outer ends of said tubes, a protective refractory casing received around said tubes and said member, an electrically insulating bushing supporting the inner ends of said tubes and secured within the inner end of said casing, a first lead extending inside said first tube from the inner end thereof to a first point thereon, said first lead having a terminal portion engaging said first tube at said first point, a second lead extending inside said second tube between the inner and outer ends thereof and then extending into the outer end of said first tube to a second point thereon spaced from said first point, said second lead having a terminal portion engaging said first tube at said second point, a portion of said first tube between said terminal portions of said leads constituting a pyristor element affording variable resistance at high temperatures, a pair of terminals mounted on said bushing and connected to said first and second leads, a pair of contacts engaging said terminals, and springs biasing said contacts against said terminals to compensate for expansion and contraction thereof due to changing temperature.

7. In a device for measuring high temperatures, the combination comprising a tube made of a refractory ceramic material, said tube having first and second end portions, supporting means affording support for said first and second end portions, a first electrically conductive lead extending inside said first end portion of said ceramic tube from one end thereof to a first point therealong and anchored securely to said ceramic tube at said first point, a second electrically conductive lead extending inside said second end portion of said tube from the opposite end thereof to a second point therealong and anchored securely to said ceramic tube at said second point, said second point being spaced along said second tube from said first point, the portion of said tube between said first and second points being entirely free of electrically conductive material other than the ceramic material of said tube, the ceramic material of said tube between said first and second points thereby constituting the sole means of electrical conduction between said first and second points and affording electrical resistance which varies as a function of temperature at high temperatures, said first and second end portions of said tube providing support for the portion of said ceramic tube between said first and second points and also heat shielding for said first and second electrically conductive leads.

8. The combination of claim 7, in which said supporting means includes a rigid support for at least one of said end portions of said ceramic tube.

9. The combination of claim 7, in which the portion of said ceramic tube between said first and second points constitutes only a fraction of the length of said ceramic tube.

References Cited in the file of this patent

UNITED STATES PATENTS

| 822,338 | Bennett | June 5, 1906 |
| 2,308,459 | Schwarzkopf | Jan. 12, 1943 |

FOREIGN PATENTS

| 857,984 | Germany | Dec. 4, 1952 |

OTHER REFERENCES

"Carboloy Thermistor Manual," No. TH-13, March 22, 1954.